May 10, 1955

L. S. HOWARD 2,708,135

ARM REST

Filed Aug. 18, 1952

INVENTOR.
LOUIS S. HOWARD
BY
Harness and Harris
ATTORNEYS.

May 10, 1955     L. S. HOWARD     2,708,135
ARM REST

Filed Aug. 18, 1952     2 Sheets-Sheet 2

INVENTOR.
LOUIS S. HOWARD
BY
Harness and Harris
ATTORNEYS.

United States Patent Office 2,708,135
Patented May 10, 1955

2,708,135

ARM REST

Louis S. Howard, Detroit, Mich., assignor to Chrysler Corporation, Highland Park, Mich., a corporation of Delaware Application August 18, 1952, Serial No. 304,900

9 Claims. (Cl. 296—44)

The present application relates to arm rest structure for automotive vehicles, particularly to the side arm rest for the rear seat of such a vehicle.

It has been customary for several years in the automobile industry to install a permanent type side arm rest which is immovably installed for the use of the rear seat passengers. In order to be located for maximum convenience and comfort to the user, the usual rear side arm rest has unnecessarily encumbered the door passage and caused inconvenience in some instances to the rear seat passengers when they are entering or leaving the automobile. The disadvantage of inconveniences caused by a rear side arm rest is eliminated according to the present invention.

An object of the invention is to provide adjacent a vehicle door opening, a retractible rear side arm rest which after retraction will no longer encumber or effectively reduce the size of the door opening.

Another object is the provision of an arm rest which is pivotally mounted adjacent a closed door opening and which will automatically be pivoted out of the way when the door is open.

A further object is the provision of a retractible arm rest for a vehicle which is positively connected at one end of the body opening structure and which is releasably and positively connected at the opposite end to a door thereby forming a rigid and solid feeling structure even though a retractible one.

Another object is the provision in a vehicle, of a door supported retractible arm rest which engages a releasable door support designed so as not to have an exposed catch or latch which can snag clothes but which yet operates effectively and does not appear unsightly.

Further features, objects and advantages will either be specifically pointed out or become apparent when for a better understanding of the invention, reference is made to the following written description taken in conjunction with the accompanying drawings in which.

Figure 1:
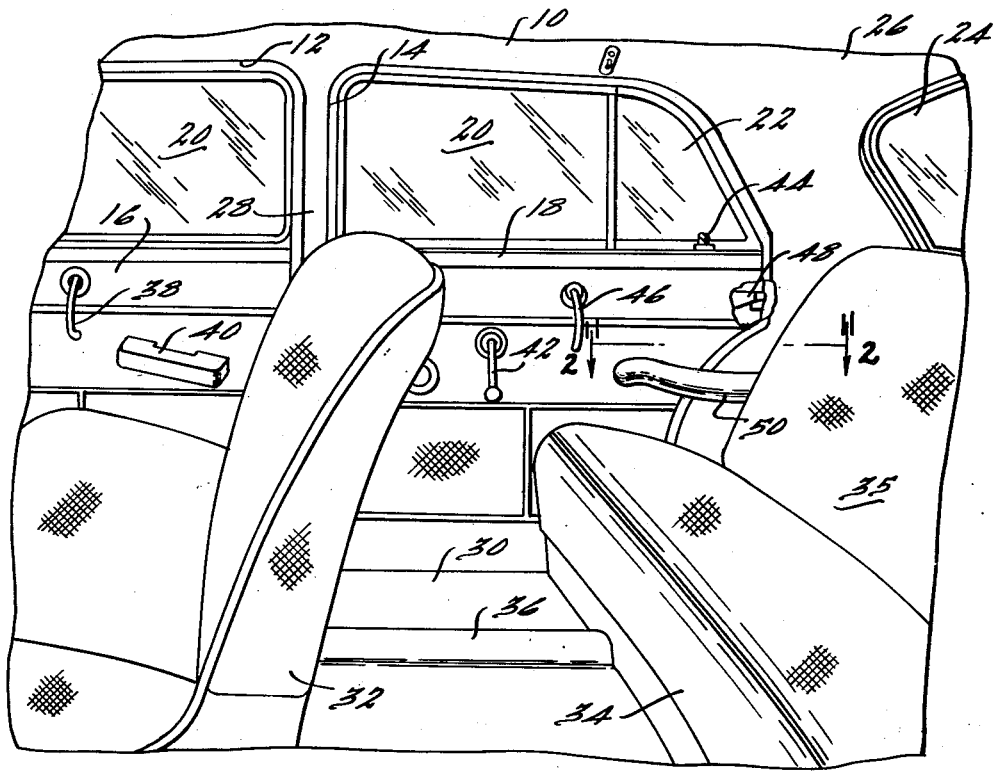
Figure 1 is a perspective view of the present novel arm rest incorporated in a vehicle body.
Figure 2:
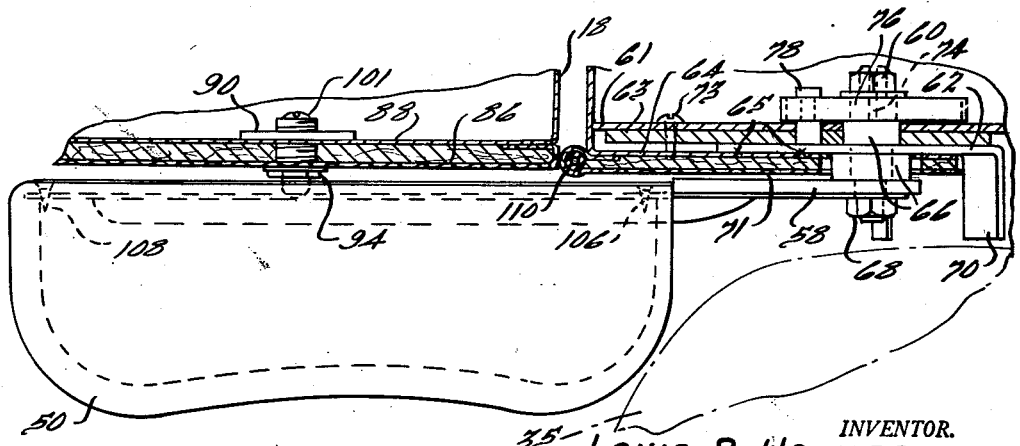
Figure 2 is a plan view taken along the section lines 2—2 in Figure 1.

In Figures 1–4 of the drawings, a vehicle body 10 is shown which is provided with a front door opening 12 and a rear door opening 14 on one side of the body, and a pair of similarly disposed and equipped door openings, not shown, disposed on the opposite side of the body 10. A front door 16 is hingedly mounted at its forward edge so as swingably to close the front door opening 12 and a rear door 18 is hingedly mounted at its forward edge so as swingably to close the rear door opening 14. Each of the doors 16 and 18 contains a vertically slidable window glass 20, and the rear door 18 is shown to include a vent wing glass 22 pivoted to swing about a pair of coaxial, vertically disposed pivots. The body 10 also incorporates a rear window glass 24 and a rear quarter 26.

A body pillar 28, commonly termed a B post, supports the hinges by which the rear door 18 is hingedly mounted and the body pillar 28 foots at one side of a generally upholstery-covered floor pan 30 for the body. The upholstered floor pan 30 supports a front seat 32 and a rear seat 34 provided with a back cushion 35. The floor pan 30 is formed with an upwardly deflected propeller shaft tunnel 36 which extends underneath the front seat 32 to a point under the rear seat 34. The front door 16 is shown to have a remote lever 38 for operating the door latch and a fixed arm rest 40. The rear door has a crank 42 for operating the vertically slidable glass panel 20 through a suitable regulator mechanism, not shown, and the rear door 18 further incorporates a vent wing latch handle 44 for positioning the vent wing 22 about its vertically disposed pivots. A remote handle 46 is mounted to the rear door 18 for operating a door latch 48 which engages a suitable striker plate on the rear quarter structure 26. Disposed at the side of the rear seat 34 adjacent the door 18 and the rear quarter panel structure 26, there is provided a retractible arm rest 50.

The arm rest 50 contains sponge rubber 52 in the interior reinforced by an interior plate 54. The plate 54 is welded to a metal side reinforcing bracket 55 which rigidifies the arm rest structure. An upholstery covering 56 is provided to cover the exterior of the arm rest 50. The reinforcing bracket 55 is secured to an L-shaped arm member 58 which is fixedly supported on a rotating pivot 60. A plate 61 and another plate 63 are welded to a bracket 62 so as to form a bracket assembly welded at 65 adjacent a wheel house portion 64 to the rear quarter panel structure 26. The bracket assembly has a pair of sleeves 66 welded one on each side thereof in which the rotating pivot 60 is journalled, and a nut 68 secures the pivot so as to prevent axial shift thereof. The bracket 62 included in the bracket assembly is provided with an upper stop 70 and a lower stop 72 to limit the arc of travel of the arm 58 and the pivot 60 which move together as a unit. The pivot 60 is slotted at 74 to receive the inner end of a preloaded flat coil spring 76 which has the outer opposite end thereof looped around and secured to an anchor pin 78. The spring 76 is coiled in a fashion such as to oppose yieldably any downward movement of the arm rest 50 from the dotted line position 50ᵃ as shown by dotted lines in Figure 3, along an arc of travel as indicated at 80, into the solid line position shown by the full lines in Figure 3. One or more screws 73 are provided to hold the plates 61 and 63 securely to the rear wheel house portion 64 or to the quarter structure 26. A striker plate 82 is secured to the arm rest bracket 55 by means of a stamping 81 and one or more screws 83. The striker plate is inwardly deflected so as to form an aperture 84. The rear door 18 is hollow and on the inner side thereof includes a fabric trim panel 86 and an inner door panel 88 which are disposed in closely spaced adjacency.

Figure 3:
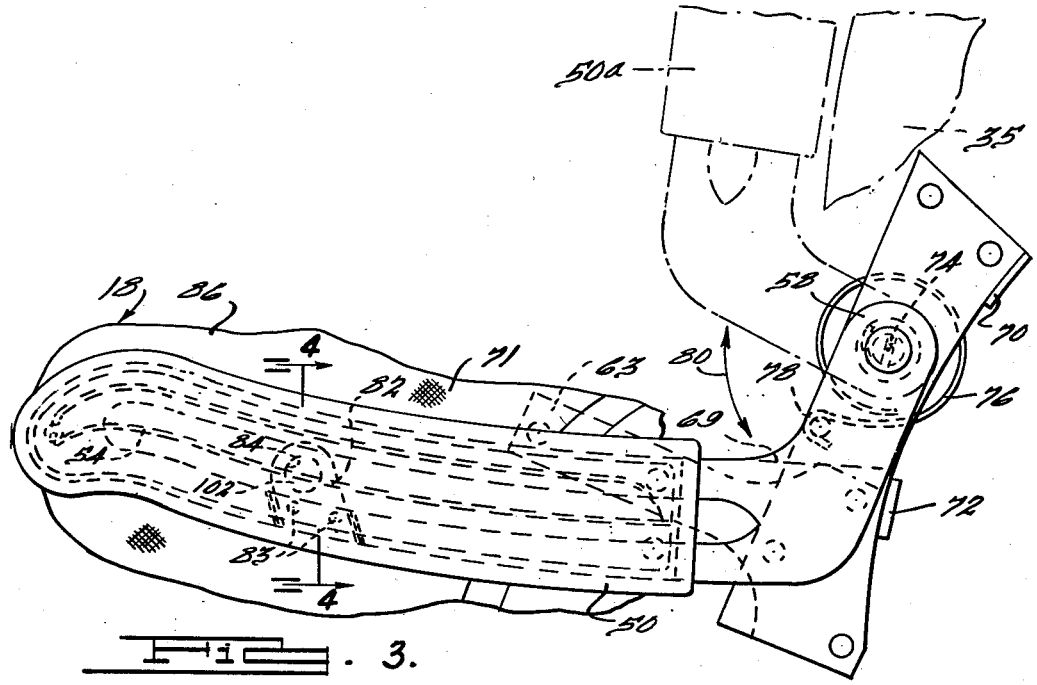
Figure 3 is a side elevation of the arm rest.
Figure 4:
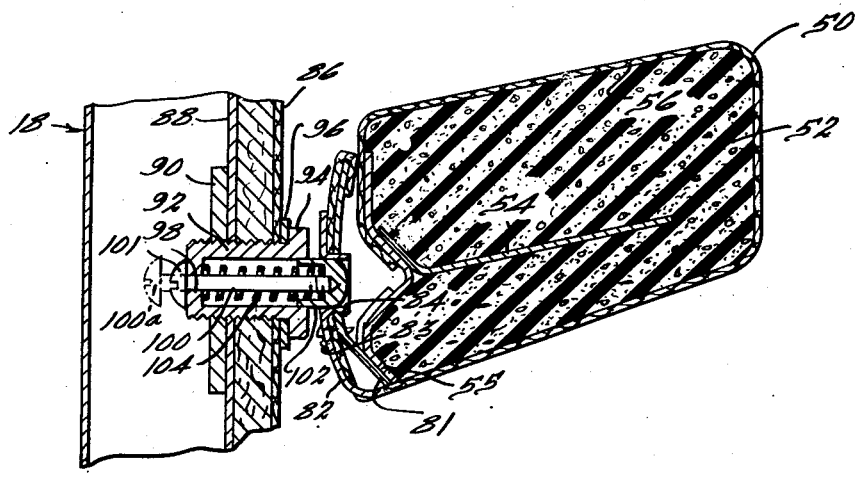
Figure 4 is a transverse section taken along the lines 4—4 in Figure 3.

At a location on the inner door panel 88 closely adjacent the solid line position for the arm rest 50, shown in Figure 3, a stiffening plate 90 is provided which is apertured and which threadably receives a cup-like member 92. The cup-like member 92 has a hexagonally-shaped head 94 which compresses a stainless steel washer 96 against the trim panel 86. At the end opposite the end 94, the cup-shaped member 92 is apertured at 98 for slidably receiving a headed stem 100 which has a head 101 engaging the apertured end of the member 92 and which is depressible through the aperture 98 so as to assume a position in the interior of the door 18 indicated by the dotted lines 100ᵃ in Figure 4. The stem 100 threadably receives a semi-spherically-shaped plunger 102 which fits into the registering aperture 84 provided in the arm rest striker plate 82. A yieldable means 104 preferably in the form of a precompressed coil spring, acts between the apertured end of the threaded member 92 and the semi-spherically-shaped plunger 102. The main body of the arm rest 50 is secured to the arm 58 by means of one or more threaded fasteners 106, 108. A roll or bead 110 of trim fabric is provided so as to seal off the gap between the door 18 and the margins of the door opening 14.

The operation of the arm rest 50 in the preceding Figures 1–4 is such that the arm rest may manually be pivotally swung from the dotted line position 50ᵃ adjacent the seat back 35 in Figure 3 into the solid line position shown in Figure 3 whereupon the pivot 60 moves therewith and further compresses the precompressed flat coil spring 76. If at this time the rear door 18 is in its closed position, the striker plate 82 engages the round nose of the plunger 102 and moves the stem assembly and the head 101 thereon into a depressed position within the hollow of the rear door 18. When, due to continued movement of the arm 50, the aperture 84 thereof is brought into registration with the plunger 102, the plunger is moved due to the force of the compressed spring 104 and advances into the aperture 84. Thereafter the arm rest is firmly and releasably latched in place, being supported at its front end on the plunger 102 and at the rear end on the pivot 60 swingable therewith. Opening of the door latch 48 for the rear door, for instance by manual operation of remote lever 46, causes the inner door panel structure 88 to swing outwardly with the door thus withdrawing the plunger 82 from the aperture 84 and permitting the arm rest 50 to act under influence of the flat coil spring 76 to swing upwardly out of the way into the dotted line position 50ᵃ adjacent the seat back 35, Figure 3, so as no longer to obstruct the rear door opening 14.

As herein disclosed, the invention is shown embodied in a retractible arm rest at the rear side part of the vehicle. It is evident that a front arm rest could equally well incorporate many of the present advantages and features of the invention. So also the drawing shows an arm rest for a rear door hingedly mounted at its front edge, but self-evidently, the arm rest can be utilized in conjunction with a rear door hingedly mounted at its rear edge. The plunger 102 is shown carried by a door panel 88, and the apertured striker plate 82 is shown mounted to the swingable arm rest, but indeed, it is not essential to the invention that cooperating parts be thus arranged and their position may be interchanged to the extent that the plunger or equivalent is carried by the arm rest 50 and the apertured striker plate is carried by the door structure 18.

Variations within the spirit and scope of the invention described are equally comprehended by the foregoing description.

What is claimed is:

1. For use with a vehicle body having a door opening and an operable door closing said door opening, an arm rest having a pivot rigidly carried thereby for connecting one end portion thereof to the vehicle body for swinging movement from a first substantially vertical arm-rest position to a second substantially horizontal position adjacent the door, and having yieldable torsion means effective to act between said pivot and said body for yieldably opposing movement of said arm rest into said second position, said arm rest being engageable with means on said door for holding the arm rest in said second position.

2. In an automotive vehicle body having front and rear seats and a rear quarter for the body at each side of the rear seat, a door adjacent the rear seat at one side and an arm rest swingably mounted to the rear quarter at that side so as to swing into a position juxtaposed to the door, and means on the door for releasably engaging the juxtaposed arm rest and effective to release the same when said door is opened.

3. In an automotive vehicle body having front and rear seats and a rear quarter for the body at each side of the rear seat, a door adjacent the rear seat at one side and a spring pressed arm rest swingably mounted to the rear quarter at that side so as to compress the spring and swing into a position juxtaposed to the door, and means on the door for releasably engaging the arm rest when juxtaposed as aforesaid and effective to release the same to swing under the action of the spring when said door is opened.

4. In an automotive vehicle body having front and rear seats and a rear quarter for the body at each side of the rear seat, a door adjacent the rear seat at one side and an arm rest having a recessed portion and being swingably mounted to the rear quarter at that side so as to swing into a position in which said recessed portion is adjacent the door, and a plunger on the door for releasably engaging the recessed portion of the juxtaposed arm rest and effective to release the same when said door is opened.

5. In a vehicle body structure having a door opening and a seat there adjacent, a hollow door for closing said opening and having an inner panel, a plunger protruding from the surface of the inner panel and being provided with a stem having a path of travel into the interior of said hollow door, and an arm associated with the body structure adjacent the seat and door and having a plunger receiving recess, said arm being movable into position in which said recess receives said plunger so as to prevent said arm from further movement.

6. In a vehicle body structure having a door opening and a seat there adjacent, a hollow door for closing said opening and having an inner panel, a plunger protruding from the surface of the inner panel and being provided with a stem having a path of travel into the interior of said hollow door, spring means for urging said plunger into a protruding position in which the stem is relatively retracted from the interior of said door, and an arm associated with the body structure adjacent the seat and door and having a plunger receiving recess, said arm being movable into a position in which said recess receives said plunger so as to prevent said arm from further movement.

7. In a vehicle body structure having a door opening and a seat there adjacent, a hollow door for closing said opening and having an inner panel, a plunger protruding from the surface of the inner panel and being provided with a stem having a path of travel into the interior of said hollow door, and a member associated with the body structure adjacent the seat and door and having an apertured striker plate, said member being movable into a position in which said striker plate engages said plunger and depresses the same, said plunger thereupon entering the aperture thereof so as to prevent said member from further movement.

8. In a vehicle body, an arm rest member connected to the body for swinging movement in a substantially vertical plane, a door member hinged to the body for swinging movement about a vertical axis and being swingable into a position in which the plane of the door is in substantial juxtaposition to the vertical plane aforesaid, an element receiving recess on one of said members, a releasable element on the other member received in said recess to prevent the arm rest member from moving relative to the door member when the door member assumes the position aforesaid and the arm rest member is adjacent thereto, and a torsion spring means interconnecting a portion of said body and said arm rest member for biasing the latter away from a proximate position with respect to said door.

9. For use with an automotive vehicle provided with a body opening having body structure there adjacent and a door structure thereacross for closing the opening, each said structure having a reinforcement, an elongated arm rest having mounting means for positively pivotally connecting one end thereof to one said reinforcement for relative swinging movement of the arm rest, and mounting means for disengageably connecting the other end thereof to the other said reinforcement so as to be caused to become disengaged from the same when said door structure is opened, said first named mounting means including a pre-loaded elastic device for causing retracting swinging movement of said arm rest when said second named mounting means becomes disengaged from said other reinforcement.

References Cited in the file of this patent

UNITED STATES PATENTS

| | | |
|---|---|---|
| 1,896,477 | Boller | Feb. 7, 1933 |
| 2,206,744 | Loecher | July 2, 1940 |
| 2,249,849 | Owler | July 22, 1941 |
| 2,278,749 | Todd | Apr. 7, 1942 |

FOREIGN PATENTS

| | | |
|---|---|---|
| 807,538 | France | Oct. 19, 1936 |